Nov. 6, 1923.

L. LYNDON 1,472,923

CELL CONNECTER FOR ELECTRIC BATTERIES

Filed Oct. 4, 1921

WITNESSES:

Lamar Lyndon INVENTOR

Patented Nov. 6, 1923.

1,472,923

UNITED STATES PATENT OFFICE.

LAMAR LYNDON, OF NEW YORK, N. Y.

CELL CONNECTER FOR ELECTRIC BATTERIES.

Application filed October 4, 1921. Serial No. 505,418.

*To all whom it may concern:*

Be it known that I, LAMAR LYNDON, a citizen of the United States, and resident of New York, in the county and State of New York, have invented certain new and useful Improvements in Cell Connecters for Electric Batteries, of which the following is a specification.

My invention relates to cell connecters which are mechanically demountable, for electric batteries, particularly for the lead-acid type of storage batteries.

I am aware that many efforts have been made to provide such cell connecters, and that some of these have been more, or less, successful for a short period of time, but, to my knowledge, there is no device in existence which prevents deterioration of the mechanical elements forming a necessary part of such cell connecters, in a comparatively short space of time, owing to the fact that the mechanical elements made of metals other than acid-resisting material are being continually attacked by the acid which will creep through almost infinitesimal space and existing devices fail to provide protective means against this destructive action of the creeping acid.

My invention provides for a connection between adjacent cells of an electric battery, which is demountable, and, at the same time, free from the serious objections stated above, the acid being prevented from reaching the portions of my device which are non acid-resisting. Connecters made in accordance with my invention have actually withstood the action of acid and acid fumes about them, for a period of nearly two years, no corrosion or deterioration being indicated after this long period of time.

Referring to the accompanying drawings.

Figure 1:
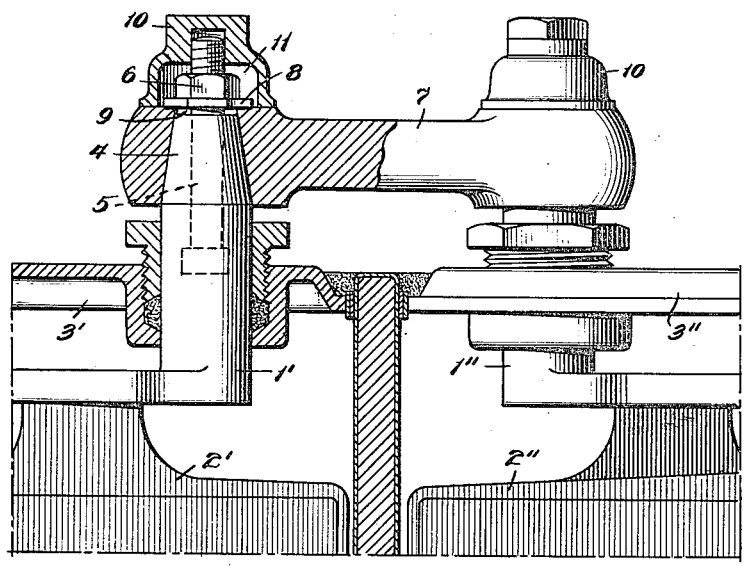
Figure 1 is an elevation of a portion of two adjacent cells and of a connecter between them, parts being shown in cross section.
Figure 2:
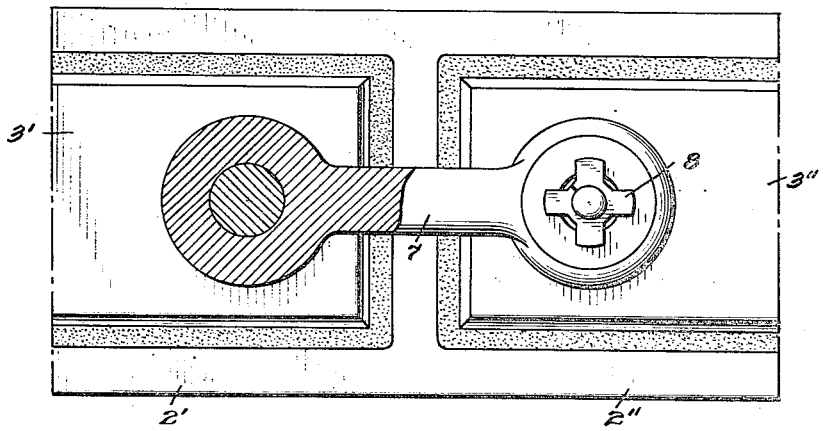
Figure 2 is a top view of this portion of the battery, a part of the connecter being shown in cross section, the other part of the connecter having the nut and cap removed.

Referring particularly to Figures 1 and 2, the terminal posts 1' and 1" of the elements 2' and 2" of two adjacent cells, after passing through the covers 3' and 3" of the adjacent cells, are tapered at the upper ends, as at 4. Cast into each terminal post is a stud, as indicated at 5, made of some hard metal, such as brass or iron. The upper portion of the stud 5 projects well above the tapered end of the terminal post and is threaded to receive the nut 6. The connecter link 7 has a tapered hole at each end, tightly fitting around the corresponding tapered portion of the terminal post. In order to clamp the connecter link down onto the terminal posts and obtain thorough electrical contact between the terminal posts and the connecter link, a spider 8 is interposed between the nut 6 and the upper surface of the connecter link 7, the nut 6 being then tightly screwed down and pressing the spider wings, and thereby the terminal post, onto the connecter link. The tapered portion of the terminal post does not quite reach the upper surface of the connecter link opening, leaving an open space 9 between the terminal post and the spider 8, when the nut 6 is tightly screwed down. A cap 10, made of rubber, celluloid or some other acid-resisting material, screws unto the stud 5 and fits over the connecter link opening, affording a chamber 11 which may be filled with petrolatum or some similar acid-resisting substance. Clearly, the petrolatum will penetrate under the spider 8 and fill the space 9.

Figure 3:
Figure 3 is a detail of the connecter.

With the arrangement as described, it is clear that no matter in what direction acid creepage may take place, the acid will be encountered and arrested by the petrolatum before it can reach a vulnerable portion of the locking mechanism, i. e. stud, nut and spider. Furthermore, being fully protected by the cap 10, the acid-resisting material which surrounds the locking mechanism is held in place and forms an uninterrupted and permanent protection for the locking mechanism In portable batteries, or those subject to vibration, I prefer to make the spider of spring steel or spring bronze, and make a radial cut from the inner hole to the outer edge of the stock, and then bend it so that the surface is warped, similarly to the condition of a spring washer, as shown in the detail drawing, Figure 3. When the nut 6 is screwed down tightly on the spider, flattening it, it will act as a nut lock and prevent the nut 6 from working loose under vibration.

Having duly described my invention, I claim:

1. In a connecter for electric batteries, a connecter link made of acid-resisting material, having tapered holes, the terminal posts of the battery having tapered ends fitting into said tapered holes but not extending all the way to the upper surface of said connecter link, a stud of hard metal cast into each terminal post and extending beyond its tapered end, the extended portion of said stud being threaded to receive a nut, a spider interposed between said nut and the upper surface of said connecter link, and a cap made of acid resisting material screwed into the threaded portion of said stud.

2. In an electric battery, a connecter link between two cells, which link is made of acid-resisting material, a mechanism for joining said link with terminal posts of said cells, which mechanism is made of nonacid-resisting material, and means for preventing access thereto of acids, including such acid as may find its way between the contiguous surfaces of said link and said terminal posts.

3. In an electric battery, a connecter link between two cells, which link is made of acid-resisting material, means for clamping said link to terminal posts of said cells, comprising portions imbedded in said terminal posts, the un-imbedded portions of said means being adapted to be completely surrounded with a plastic acid-resisting substance, and means for holding said plastic acid-resisting substance in place.

4. In an electric battery, connecting means between two cells, comprising portions made of acid-resisting material and portions of nonacid-resisting material, open space being provided between surfaces of said acid-resisting and said nonacid-resisting portions, to receive an acid resisting substance.

5. In an electric battery, a connecter link between two cells, which link is made of acid-resisting material, and a mechanism for joining said link with terminal posts of said cells, which mechanism is made of nonacid-resisting material, open space being provided between surfaces of said mechanism and surfaces of said terminal posts and connecter link, to receive an acid-resisting substance, and means for holding said acid-resisting substance in place.

6. In an electric battery, a connecter link between two cells, which link is made of acid-resisting material, nonacid-resisting means for joining said link with the terminal posts of said cells, and a chamber interposed in the path of acids from the cell to said means.

7. In an electric battery, a connecter link between two cells, which link is made of acid-resisting material, nonacid-resisting means for joining said link with the terminal posts of said cells, and means for preventing seepage of acids between said link and said terminal posts to said nonacid-resisting means.

8. In an electric battery, an acid-resisting connecter link between two cells, and nonacid-resisting means for joining said link with terminal posts of said cells, including a stud partially imbedded in each one of said terminal posts, no part of said stud being contiguous to said link.

9. In an electric battery, an acid-resisting connecter link between two cells, nonacid-resisting means for joining said link with terminal posts of said cells, comprising portions imbedded in said terminal posts, and means for preventing seepage of acid to any part of the un-imbedded portions of said nonacid-resisting means.

10. In an electric battery, connecting means between two cells, comprising portions which are acid-resisting and portions which are nonacid-resisting, and means for preventing access of acid to any part of said nonacid-resisting portions.

New York, September 15th, 1921.

LAMAR LYNDON.